March 10, 1959 W. P. CANNING ET AL 2,876,617

DIAL TELEPHONE WATCH

Filed Jan. 27, 1955 2 Sheets-Sheet 1

INVENTORS.
WILLIAM P. CANNING
NORMAN SLATER
BY James & Franklin
ATTORNEYS

INVENTORS
WILLIAM P. CANNING,
NORMAN SLATER
BY James & Franklin
ATTORNEYS 2,876,617

DIAL TELEPHONE WATCH

William P. Canning, North Woodbury, and Norman Slater, Waterbury, Conn., assignors to Benrus Watch Company, Inc., New York, N. Y., a corporation of New York Application January 27, 1955, Serial No. 484,338

4 Claims. (Cl. 58—46)

This invention relates to a dial telephone watch.

The prime object of the invention centers about the provision of a spring-motor operated watch mountable on the dial of a dial telephone, the winding and rewinding of the spring motor of the watch being effected by the number-calling oscillations of the dial.

A further prime object of the invention relates to the provision of such a telephone watch as well as its combination with the dial telephone parts, in which the watch is mountable centrally of the dial (in the place of the telephone number plate) the mounting being such that the watch is held in a stationary or fixed condition while the watch is being wound or rewound during the imparting of oscillations to the dial.

To the accomplishment of the foregoing objects and such other objects as hereinafter appear the invention relates to the dial telephone watch as well as its combination with a dial telephone as sought to be defined in the appended claims taken together with the following specification and accompanying explanatory drawings, in which:

Figs. 9 to 13 show a modification of the invention in which:

Fig. 9 is a front elevational view of the dial telephone watch;

Fig. 10 is a rear elevational view thereof;

Fig. 11 is an enlarged view taken in cross-section in the planes of the broken line 11—11 of Fig. 9;

Fig. 12 is a cross-section in the plane of the line 12—12 of Fig. 11; and

Fig. 13 is an enlarged view of separated parts shown in Fig. 11, with parts shown in section.

Figures 1, 2:
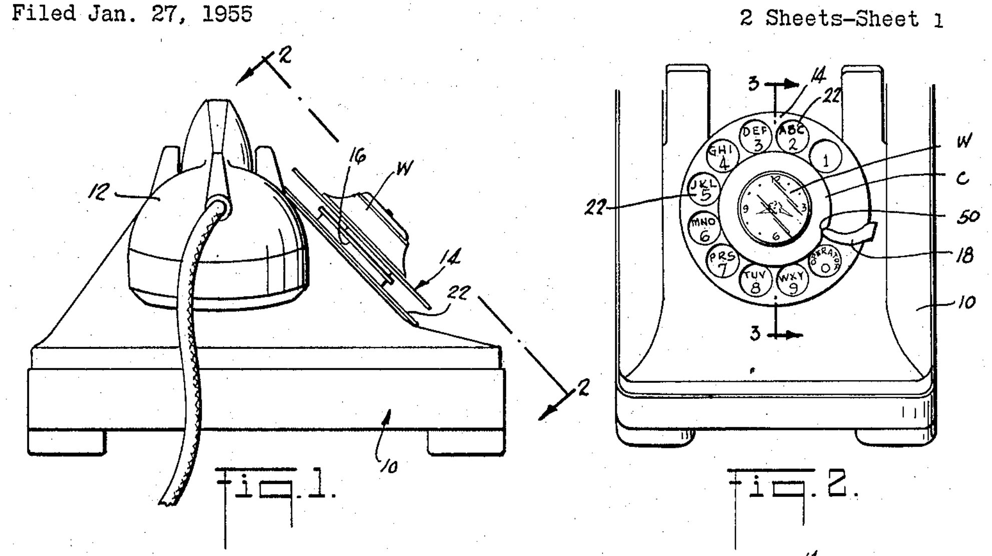
Fig. 1 is a side elevational view of a dial telephone stand showing the dial telephone watch of the present invention mounted on the dial of the telephone.
Fig. 2 is a front elevational view thereof taken from the plane of the line 2—2 of Fig. 1.
Figures 5, 6:
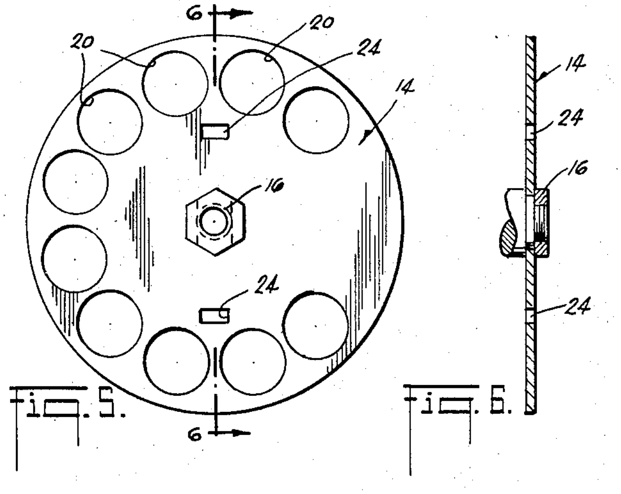
Fig. 5 is a face view of a conventional telephone dial.
Fig. 6 is a cross-sectional view taken in the line 6—6 of Fig. 5.

The dial telephone watch of the present invention is adapted to be mounted on a dial telephone, a conventional structure and form of which is depicted in Figs. 1 and 2 of the drawings comprising a telephone stand 10, a combined telephone transmitter and receiver 12 removably mounted on the stand, a finger plate 14, for convenience termed a "number calling dial" oscillatably mounted by the means 16 on the telephone stand and a finger stop 18 associated with the oscillatable dial 14, said finger stop being fixed to the telephone stand 10. The dial 14 is provided with the customary finger-engaging apertures at 20, 20 which also form windows for the call letters and numbers which are printed on a plate 22 located beneath the dial 14. The dial is also customarily provided with the spaced slots 24, 24 for receiving tabs or lugs formed on a number plate which is customarily mounted in fixed position on the dial. The watch of the present invention is designed and constructed to replace this telephone number plate.

The dial telephone watch W of the present invention comprises a watch assembly detachably mounted centrally on the telephone dial as best shown in Figs. 1 and 2 of the drawings, this assembly comprising as a detachably mounted unit a watchcase holder H and a watchcase C carrying a spring-motor operated watch movement, the watchcase being mounted on the holder in such a way that the holder and the watchcase are rotatable one relatively to the other. In the designed construction the watchcase holder H is fixed to the dial 14 whereby the holder oscillates with the dial, and the watchcase C is fixed to a part of a telephone stand whereby the watch itself is held stationary or fixed during oscillations of the dial. For effecting the winding or rewinding of the watch, mating means generally designated as M connected to the spring motor of the watch is provided for winding and rewinding the spring motor of the watch when the dial 14 is oscillated.

Figures 7, 8:
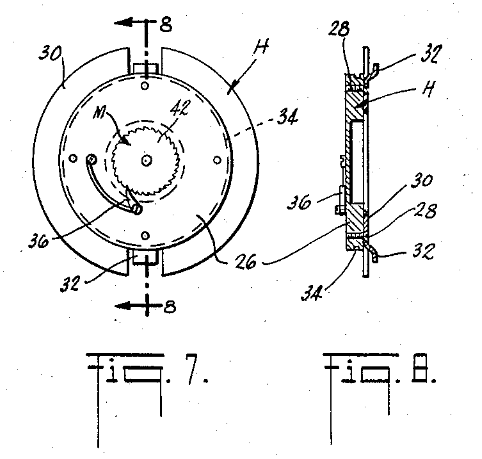
Fig. 7 is a front elevational view of the watchcase holder which forms a mounting part of the dial telephone watch (this view also showing the ratchet which forms part of the watch movement)
Fig. 8 is a view taken in cross-section in the plane of the line 8—8 of Fig. 7.

The watch holder H, separately shown in Figs. 7 and 8, comprises a watch-receiving mount 26 attached by the screws 28 to a dial-mounting plate 30, the plate 30 being formed with the spaced lugs 32, 32. The mount 26 is formed on its periphery with an annular groove 34 for a purpose to be described presently; and the said mount 26 also carries the spring-pressed pawl 36 which forms part of the mating means M referred to.

Figure 3:
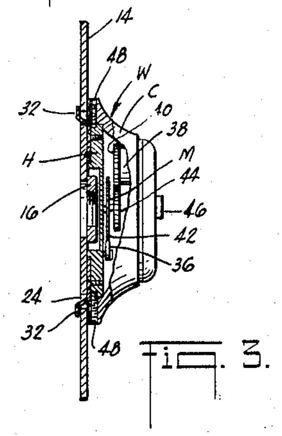
Fig. 3 is an elevational view with parts in section and other parts broken away, and taken on an enlarged scale, of the dial watch and its mounting on the telephone dial.

The watchcase C carries the usual watch movement which is operated by a spring motor indicated by the motor casing 38 formed with the usual rewinding gear 40 (see Fig. 3). Also mounted as part of the watch movement there is provided a ratchet wheel 42 which may be geared directly as at 44 (or more preferably, by speed-reducing gears) to the gear 40 of the spring motor 38, the said ratchet cooperating with the pawl 36 and forming therewith the mating means M heretofore referred to. The watch W may further include a front button 46 for adjusting the hands of the watch. As aforesaid, the watchcase C and the holder H are rotatable one relatively to the other; and to accomplish this the watchcase C is provided at its periphery with spaced shoulder screws 48, 48 which are threaded in the watchcase and which are adapted to be received by and to fit loosely in the annular groove 34 formed in the mount 26 (see particularly Fig. 4).

Figure 4:
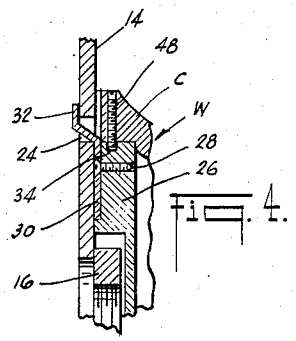
Fig. 4 is a view of a part of Fig. 3 shown on a still further enlarged scale.
Figure 9:
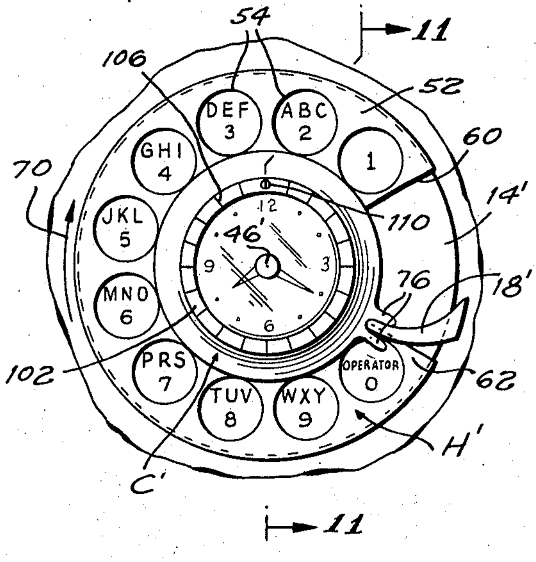

The watchcase holder H is fixedly mountable on the dial 14 by the insertion of the tabs 32, 32 thereof into the slots 24, 24 of the dial 14 (as is best seen in Figs. 3 and 4) and therefore the watchcase holder H oscillates with the dial 14. The means for fixing watchcase to a part of the telephone stand comprises a part formed in the watchcase and preferably in a peripheral notch 50 therein which engages the finger stop 18 forming part of the telephone stand (as best seen in Fig. 2) whereby the watch W is held fixed or stationary during oscillations of the dial, the rotation or oscillation of the holder H relative to the fixed or stationary watchcase C (during dial oscillation) being enabled by the watchcase mounting and guide defined by the shoulder screws 48, the termini of which seat in the annular groove 32 of the watchcase holder.

As will be evident from this described construction, the winding and rewinding of the spring motor 38 of the watch is effected by the clockwise phase of oscillation of the dial 14 during which the pawl 36 of the mating means M engages the ratchet 42 to wind the spring motor 38 through the connected gear 44. Suitable overwind preventing means known to the art may be provided to prevent overwinding of the spring motor.

In Figs. 9 to 13 of the drawings we show a modification of the dial telephone watch, the parts of the telephone stand being similar to the parts shown in Figs. 1 and 2, such parts being indicated by similar, but primed, reference characters. Thus, the telephone includes a number-calling dial 14′ oscillatably mounted by the means 16′ on the telephone stand and a finger stop 18′ associated with the oscillatable dial 14′, such finger stop being fixed to the telephone stand or support. The dial 14′ is provided with the customary finger-engaging apertures at 20′, which also form windows for the call letters or numbers which are printed on a plate 22′ located beneath the dial 14′. In this case the number plate 23 which is customarily mounted in fixed position on the dial is not removed, but is retained and forms part of the supporting means for the dial telephone watch.

In this modification the dial telephone watch W′ comprises a watch case holder H′ and a watchcase C′ carrying a spring motor operated watch movement, the watchcase C′ being mounted on the holder H′ (as in the first modification) in such a way that the holder and the watchcase are rotatable one relatively to the other, the holder being the movable part.

The watchcase holder H′ comprises in this modification a dial 52 provided with finger-engaging apertures 54 equal in size and number to the finger-engaging apertures 20′ of the telephone dial 14′ and arranged to register therewith when the dial 52 is mounted in position. The dial 52 is provided with an inwardly directed rim flange 56 and an outwardly directed hub flange 58 for mounting the holder on the telephone dial 14′ and its number plate 23 as clearly shown in Fig. 11 of the drawings. The dial 52 is provided with a segmental cutout portion 60 to permit the mounting of the dial 52 to be free of the finger stop 18′. A slight rotative movement of the dial 52 so as to permit the engagement of the dial edge 62 underneath the finger piece 18′ locates the dial 52 in its mounted position as is clearly indicated in Fig. 9 of the drawings. The dial 52 is provided at its front with a mounting plate 64 fixed thereto, the said front plate being formed with a central recess 66 and a square-shaped central opening 68 which latter forms part of a coupling means for connecting the dial 52 to the winding mechanism of the watch whereby rotation of the dial 52 in its dialing direction, indicated by the arrow 70 (Fig. 9) and by its return to normal position, will serve to actuate the winding mechanism of the watch.

Figure 11:
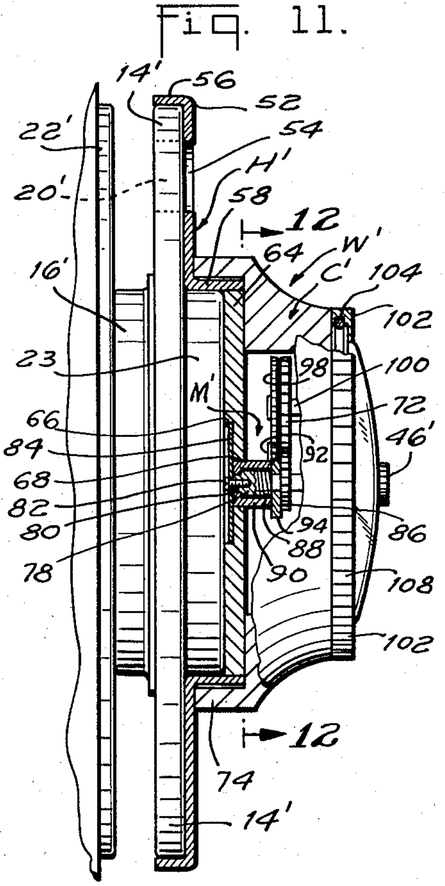
Figures 10, 12, 13:
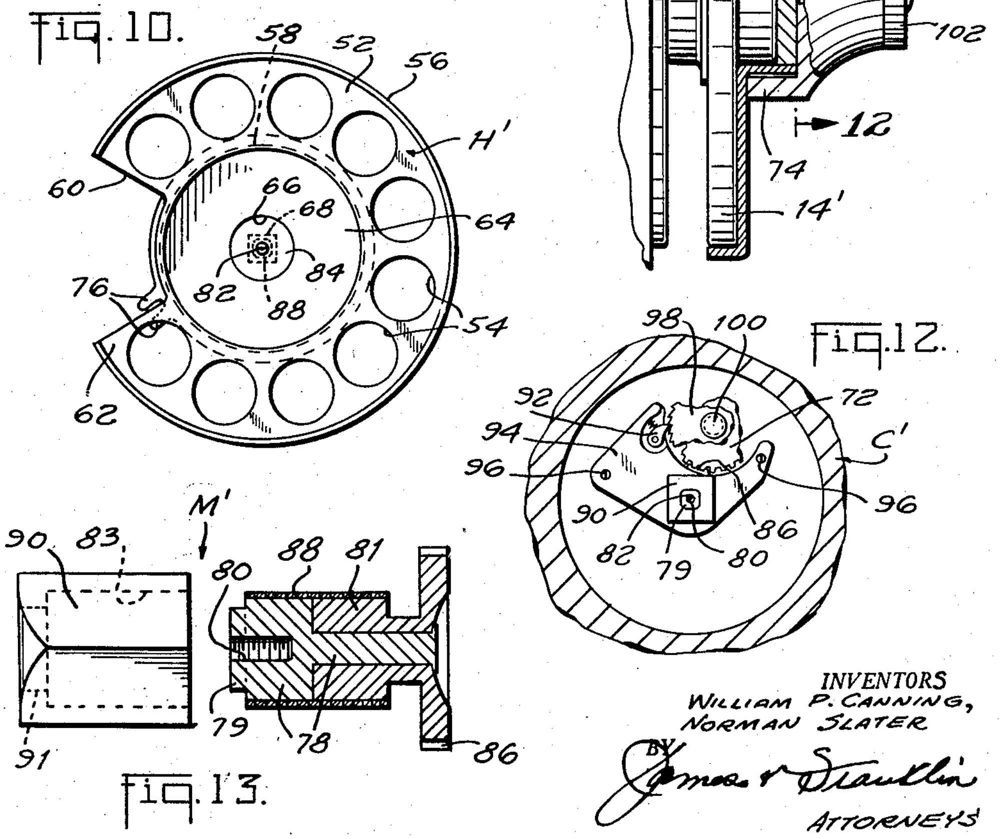

The watchcase C′ comprises a casing which may be made of a molded plastic having the shape best indicated in Fig. 11, the same housing the usual watch movement which is operated by a spring motor wound or rewound by the gear 72, the said watchcase being formed with a rearwardly extending flange 74 interiorly received by the flange 58 of the watchcase holder for mounting the watchcase on the holder, as best shown in Fig. 11 of the drawings. The watchcase C′ is also integrally provided with a fingered fork 76 between the fingers of which is received the finger stop 18′ (see Fig. 9), this constituting the means for fixing the watchcase to a part of the telephone stand. The watch W′ may further include the front button 46′ for adjusting the hands of the watch.

For securing the watchcase C′ to the watchcase holder H′ (while permitting relative movement therebetween) the watch movement is centrally arranged with a rearwardly extending stud 78 provided with a reduced squared end 79, which latter is centrally provided with a tapered orifice 80 for receiving a securing screw 82 which serves to attach a plate 84 (received by the recess 66) in position. By this means the watch W′ is secured to the watch holder H′ against axial displacement (the former being also held, as aforesaid, against rotative movement by the engagement of the forked fingers 76 and the finger stop 18′), the dial watch holder H′ being at the same time so mounted that it is rotatable or oscillatable with the dialing of the telephone.

For translating dial oscillations to a winding or rewinding of the spring motor of the watch there is provided the mating means generally designated as M′. This comprises the aforesaid centrally located stud 78 with its squared stud end 79 (which may be formed by a separate insert), the inner reduced end of the stud 78 being rotatable in a sleeve 81 (see Fig. 13) which latter carries a pinion 86 meshing with the winding gear 72. The stud 78 and sleeve 81 are closely surrounded by a coil spring 88 which receives the cylindrical bore 83 of a square-shaped adapter member 90, the latter having a square-shaped end opening 91. The square-shaped adapter is received by the similarly shaped orifice or opening 68 in the holder plate 64, and its opening 91 mates with the squared stud end 79.

By this mating means, turning the dial 52 (and the holder H′) in a dialing (clockwise—Fig. 9) direction turns the adapter 90 (held thereto at the recess 68), causing the coil spring 88 to try to open or uncoil, and thus to lose its grip between the stud 78 and the sleeve 81. The stud 78, rotated because of the mating of its end 79 with the adapter opening 91, is thus free to rotate. Turning the holder H′ in a counter-clockwise direction turns the adapter 90 and causes the spring 88 to try to close or coil up and then frictionally engage the stud 78 and sleeve 81 to tighten its grip on the stud 78 and sleeve 81, thereby causing the rotation of the stud 78 to be imparted to the sleeve 81 and its winding pinion 86 to wind the watch. These parts thus form a one-way clutch for watch winding. To check or hold the winding gear 72 during the clockwise or idle rotation of the holder H′, there is provided the check pawl 92 on the bridge piece 94 (secured to another bridge of the watch movement by screws 96, 96), engaging a ratchet 98 fixed to the shaft 100 of the winding gear 72 (see Figs. 11 and 12).

For timing a telephone conversation (as for use with long distance calls, we mount a rotatable dial ring 102 at the front of the watch casing C′ held thereto by a spring ring 104, the said dial ring having on its face "minute" subdivisions 106 and similar subdivisions 108 on its side rim. Rotation of the null point 110 of the dial ring to register with the minute hand at the beginning of the call will permit the accurate measuring off or timing of the call by counting the number of "minute subdivisions" between the null point and the position of the minute hand at the end of the call.

The use and operation of the dial telephone watch of the present invention and the advantageous functioning thereof will, in the main, be fully apparent from the above detailed descrpition. In the inventive form of Figs. 1 to 8 the watch W is mountable centrally of the dial replacing in a simple manner the customary telephone number plate, this being accomplished easily by mounting the watch assembly H—C on the dial 14 by means of the tabs 32, 32 on the watchcase mounting plate. The watch itself is held in a stationary or fixed condition while the watch is being wound or rewound during the oscillations of the dial so that the face of the timepiece is always in the upright position for easy time telling even when the telephone dial is oscillated. The watch assembly itself is made up of a simple watchcase holder with the associated modified watch, both of which are readily assembled and disassembled for purposes of use and repair.

In the inventive form of Figs. 9 to 13 the same operation is effected, the watch assembly H′—C′ being, however, directly mountable on the telephone dial 14' without removing the number plate (23).

It will be apparent that many changes may be made in the construction of the dial telephone watchcase of the present invention without departing from the spirit of the invention as defined in the following claims.

We claim:

1. A dial telephone watch for use in combination with a telephone stand having a fixed finger stop and an oscillatable finger-operated telephone dial, comprising a watch assembly mountable centrally on the telephone dial including a watchcase holder and a watchcase carrying a spring-motor operated watch movement mounted on the holder, the holder and the watchcase being rotatable one relatively to the other, means on the holder for fixing the holder to the dial whereby the watchcase holder oscillates with the dial, means on the watchcase for engaging the finger stop whereby the watch is held stationary during oscillations of the dial, and mating means on the holder and watchcase connected to the watch spring motor for winding the spring motor when the dial is oscillated.

2. The dial telephone watch of claim 1 in which the said means on the holder comprises spaced tabs adapted to be received by spaced slots in the dial, and the said means on the watchcase comprises a notch in the watchcase into which sets the said finger stop.

3. The dial telephone watch of claim 1 in which the said means on the holder comprises a mount adapted to be received by the number plate of the telephone stand, and the said means on the watchcase comprises a forked element on the watchcase into which sets the said finger stop.

4. In combination with a telephone stand having a fixed finger stop and an oscillatable finger-operated telephone dial, a watch assembly mounted centrally on the telephone dial including a watchcase holder and a watchcase carrying a spring-motor operated watch movement mounted on the holder, the holder and watchcase being rotatable one relatively to the other, means on the holder for fixing the holder to the dial whereby the watchcase holder oscillates with the dial, means on the watchcase for engaging the finger stop whereby the watch is held stationary during oscillations of the dial, and mating mechanism on the holder and watchcase geared to the watch spring motor for winding the spring motor when the dial is oscillated.

References Cited in the file of this patent

UNITED STATES PATENTS

| | | |
|---|---|---|
| 2,032,414 | Helbein | Mar. 3, 1936 |
| 2,699,034 | Maire | Jan. 11, 1955 |
| 2,714,283 | Gazda | Aug. 2, 1955 |